United States Patent
Zeng et al.

(10) Patent No.: US 11,746,597 B2
(45) Date of Patent: Sep. 5, 2023

(54) PRESSURED HORIZONTAL DIRECTIONAL DRILLING CONTINUOUS CORING DEVICE FOR ENGINEERING GEOLOGICAL INVESTIGATION

(71) Applicant: China University of Geosciences (Wuhan), Hubei (CN)

(72) Inventors: Cong Zeng, Hubei (CN); Xuefeng Yan, Hubei (CN); Peng Zhang, Hubei (CN)

(73) Assignee: China University of Geosciences (Wuhan), Hubei (CN)

( * ) Notice: Subject to any disclaimer, the term of this patent is extended or adjusted under 35 U.S.C. 154(b) by 0 days.

(21) Appl. No.: 17/505,651

(22) Filed: Oct. 20, 2021

(65) Prior Publication Data

US 2022/0042376 A1 Feb. 10, 2022

(30) Foreign Application Priority Data

Oct. 30, 2020 (CN) .......................... 202011194682.6

(51) Int. Cl.
   *E21B 25/00* (2006.01)
   *E21B 7/04* (2006.01)
   *E21B 10/02* (2006.01)

(52) U.S. Cl.
   CPC .............. *E21B 7/046* (2013.01); *E21B 10/02* (2013.01); *E21B 25/00* (2013.01)

(58) Field of Classification Search
   CPC ........... E21B 7/046; E21B 10/02; E21B 25/00
   See application file for complete search history.

(56) References Cited

U.S. PATENT DOCUMENTS

| | | | | |
|---|---|---|---|---|
| 2,258,352 | A * | 10/1941 | Catland | E21B 25/02 175/254 |
| 3,951,219 | A * | 4/1976 | Cortes | E21B 25/02 175/246 |
| 5,351,765 | A * | 10/1994 | Ormsby | E21B 25/02 175/246 |
| 6,644,424 | B1 * | 11/2003 | Fanuel | E21B 25/02 175/252 |
| 7,117,958 | B2 * | 10/2006 | Fanuel | E21B 23/06 166/117.6 |
| 10,975,683 | B2 * | 4/2021 | Adams | E21B 47/09 |
| 11,255,149 | B1 * | 2/2022 | Cao | E21B 25/02 |
| 2013/0032410 | A1 * | 2/2013 | Jolicoeur | E21B 25/02 166/212 |
| 2020/0131875 | A1 * | 4/2020 | Wan | E21B 25/06 |

(Continued)

*Primary Examiner* — Taras P Bemko

(57) ABSTRACT

A pressured horizontal directional drilling continuous coring device includes a drilling tool assembly, a spear head, a recovery pipe and a core clamping mechanism. An interior of the drilling tool assembly is provided with a drilling tool delivery and in-place reporting mechanism, a bullet positioning mechanism, a core blockage alarm mechanism, a guiding mechanism, a buffer mechanism, and an adjusting mechanism from top to bottom. The recovery pipe is provided with a first and second recovery pipe nozzles. The drilling tool delivery and in-place reporting mechanism includes a top cap, a first spring and a spring cap mounted on one end of the first spring, so that when the first spring is in a compressed state, the spring cap is located at a lower end of the top cap, and a mud path is formed between the spring cap and the top cap.

9 Claims, 5 Drawing Sheets

(56) References Cited

U.S. PATENT DOCUMENTS

2021/0164300 A1\* 6/2021 Wan ................ E21B 31/18
2022/0049564 A1\* 2/2022 Zeng ............... E21B 25/10
2022/0098948 A1\* 3/2022 Li .................. E21B 34/14

\* cited by examiner

II-II

III-III

PRESSURED HORIZONTAL DIRECTIONAL DRILLING CONTINUOUS CORING DEVICE FOR ENGINEERING GEOLOGICAL INVESTIGATION

CROSS REFERENCE OF RELATED APPLICATION

The present invention claims priority under 35 U.S.C. 119(a-d) to CN 202011194682.6, filed Oct. 30, 2020.

BACKGROUND OF THE PRESENT INVENTION

Field of Invention

The present invention provides a pressured horizontal directional drilling continuous coring device for engineering geological investigation, which belongs to the field of engineering geological investigation.

Description of Related Arts

Wire-line core drilling is an advanced core drilling technology. It uses a large-diameter drill pipe and a core tube is set in the drill tool. During the drilling process, the core is slowly installed in the core tube. While being full of the core, the core tube is lifted out of the drill pipe by a fisher with a rope. After the core is extracted, the core tube is put through the drill pipe to the bottom of the hole for continuing to drill. Compared with the ordinary core drilling technology, the wire-line core drilling has advantages of good drill hole deflection control, high drilling efficiency, low engineering cost, high core extraction rate, and fewer accidents in the drill hole; especially in drilling through complex formations, it has incomparable advantages over other construction technologies. Therefore, it is widely used in the field of engineering geological investigation and resource exploration. Its operation is characterized by the fact that it is not necessary to raise all the drill pipe columns in the borehole when taking cores, but to use a special salvager with a wire rope to lift the inner tube at the bottom of the borehole containing cores to the ground through the center hole of the drill pipe in the borehole to obtain cores, thus reducing the number of times of lifting down the drill and the auxiliary time of raising and lowering the drilling tool, thus improving the drilling efficiency. The traditional vertical hole geological drilling device consists of drilling tool assembly and coring salvage assembly, the drilling tool assembly passes through the upper overburden layer to reach the layer where the tunnel axis is located, then the coring points are arranged at intervals along the tunnel axis, then the cores are drilled at the coring points by the coring drilling tool, and then the geological section along the line is predicted by the line method, because this device can only obtain the cores at intervals along the axis, thus this device cannot truly and comprehensive reflection of the geological characteristics of the tunnel envelope, and special occasions such as at sea level, dense areas of surface buildings, address dip-slip areas and other complex situations, the use of vertical holes to explore the geological situation, and the implementation of the more difficult. And although the current horizontal directional drilling technology can precisely guide and control the direction, it does not set up the coring and salvaging assembly, and thus cannot obtain the core.

Therefore, it is necessary to provide a pressured horizontal directional drilling continuous coring device for engineering geological investigation, so as to solve the above-mentioned problems in the prior art.

SUMMARY OF THE PRESENT INVENTION

The present invention provides a pressured horizontal directional drilling continuous coring device for engineering geological investigation, which combines guidance and coring, and is able to not only accurately control the direction but also efficiently obtain cores, and the device also has the functions of in-place messaging and core blockage alarm.

Accordingly, the coring device comprises a drilling tool assembly, a spear head installed in the drilling tool assembly, a recovery pipe and a core clamping mechanism, wherein an interior of the drilling tool assembly is provided with a drilling tool delivery and in-place reporting mechanism, a bullet positioning mechanism, a core clogging alarm mechanism, a guiding mechanism, a buffer mechanism, and an adjusting mechanism from top to bottom; the recovery pipe is provided with a first recovery pipe nozzle and a second recovery pipe nozzle.

The drilling tool delivery and in-place reporting mechanism comprises a top cap, a first spring and a spring cap mounted on one end of the first spring, so that when the first spring is in a normal state, the spring cap fits side by side with the top cap, and when the first spring is in a compressed state, the spring cap is located at a lower end of the top cap, and a mud path is formed between the spring cap and the top cap. Preferably, the drilling tool delivery and in-place reporting mechanism also comprises a top blade, a spring room, a sealing ring sleeve, a first spring, a first suspended seat ring and a spring bottom plate, wherein the first spring is mounted on one side of the spring bottom plate, the top blade is mounted on the other side of the spring bottom plate, the sealing ring sleeve is fitted to the inner wall of the single-walled drill pipe assembly, and the first suspension seat ring is connected to the sealing ring sleeve and the top blade.

The core clogging alarm mechanism comprises a sliding sleeve and a disc spring, wherein the sliding sleeve is mounted on a side of the disc spring, and the sliding sleeve is moved with the disc spring to completely cover the second recovery pipe nozzle.

The drilling tool assembly comprises a single-wall drill pipe assembly and a drill bit mounted on a bottom end of the single-wall drill pipe, wherein the single-wall drill pipe assembly comprises a first single-wall drill pipe, a second single-wall drill pipe and a third single-wall drill pipe from top to bottom, wherein the second single-wall drill pipe is made of non-magnetic materials.

Preferably, the first single-wall drill pipe, the second single-wall drill pipe and the third single-wall drill pipe are interconnected by a first joint and a second joint, respectively.

Preferably, the bullet positioning mechanism comprises a first spring pin, a second spring, a bullet stop head, two bullets, a bullet room, a first bullet pin and a second bullet pin, wherein an outer wall of the bullet room is fitted to the inner wall of the single-walled drilling pipe assembly, the two bullets are interconnected by the first bullet pin, and two ends of the second spring are connected to the two bullets respectively.

Preferably, the core blockage alarm mechanism comprises a spring pin.

Preferably, the guiding mechanism comprises a probe room positioning outer lock mounted on an inner wall of the second single-walled drill pipe, a probe room positioning inner lock connected to the probe room positioning outer lock, a single-action mechanism mounted on the probe room positioning inner lock and a probe room, and a probe rod mounted in the probe room.

Preferably, the probe room positioning inner lock is connected with the single-action mechanism through bearings to ensure that the probe room does not rotate with the second single-walled drill pipe.

Preferably, a first centralizing ring is provided between the probe room and the second single-wall drill pipe, a second centralizing ring is provided between the core tube and the third single-wall drill pipe.

From the above solutions, it can be seen that the pressured horizontal directional drilling continuous coring device for engineering geological investigation using mud pressure to place the core clamping mechanism, so that the efficiency is greatly improved, when the mud pressure the drilling tool to the place where in-place reporting mechanism is, that is, the mud impact spring cap, if the spring cap withstand less pressure, the first spring is in a normal state, if the spring cap withstand more pressure, the top blade is pressed against the spring bottom plate to compress the first spring in the spring room, and at the same time, the top cap will rise relatively to form a mud path, and the mud pressure will be reduced instantly to realize the in-place alarm function.

The core blockage alarm mechanism can generate upward thrust when the core is blocked or when the core is filled with the core tube, so that the butterfly spring will drive the slide sleeve to move upward to completely cover the second recovery pipe nozzle, causing the pressure in the closed cavity where the sliding sleeve is located to rise and play the role of blockage alarm function.

The single-action mechanism makes the probe rod installed in the probe rod chamber not rotate with the drill pipe, thus extending the service life of the probe rod. The probe rod in the probe room can send electronic signals for accurate guidance of drilling. The inner probe room positioning lock and the outer probe room positioning lock work together to ensure that the position of the probe room and the second single-walled drill pipe are fixed relative to each other to ensure accurate guidance. The second single-wall drill rod is made of non-magnetic materials to avoid affecting the accuracy of probe rod measurement.

The buffer mechanism has the function of shock absorption, so that the impact force suffered by the chucking core mechanism during the lifting or pressing process is reduced. The adjusting mechanism can adjust the length between the chucking core mechanism and the guiding mechanism to facilitate the adjustment of the position where the chucking core mechanism is located.

Figure 1:
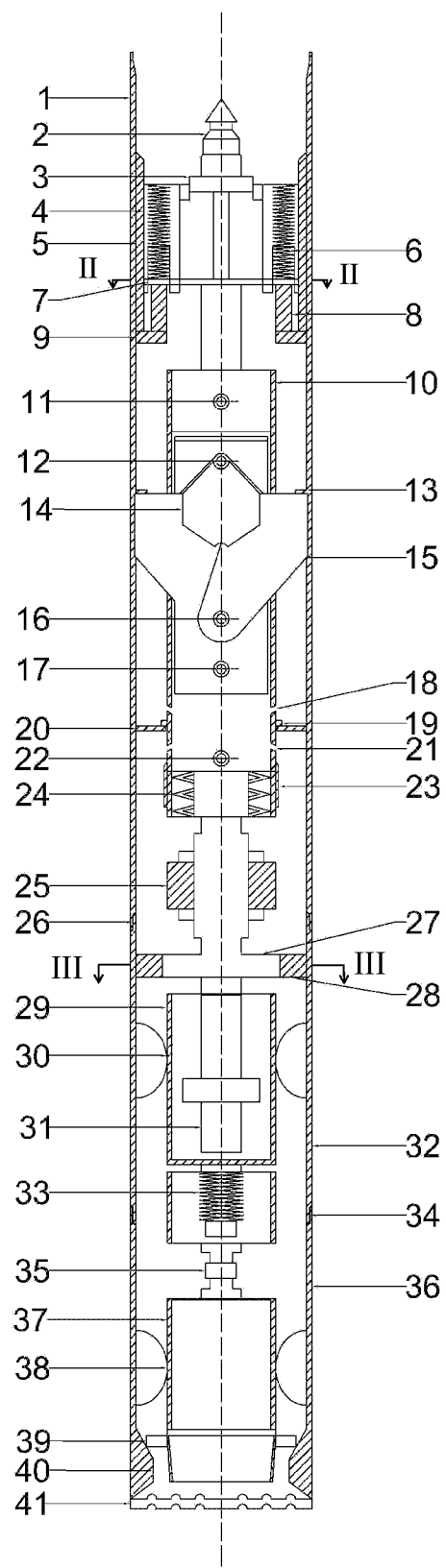
FIG. 1 is an overall structure diagram of a pressured horizontal directional drilling continuous coring device for engineering geological investigation provided by the present invention.
Figure 1A:
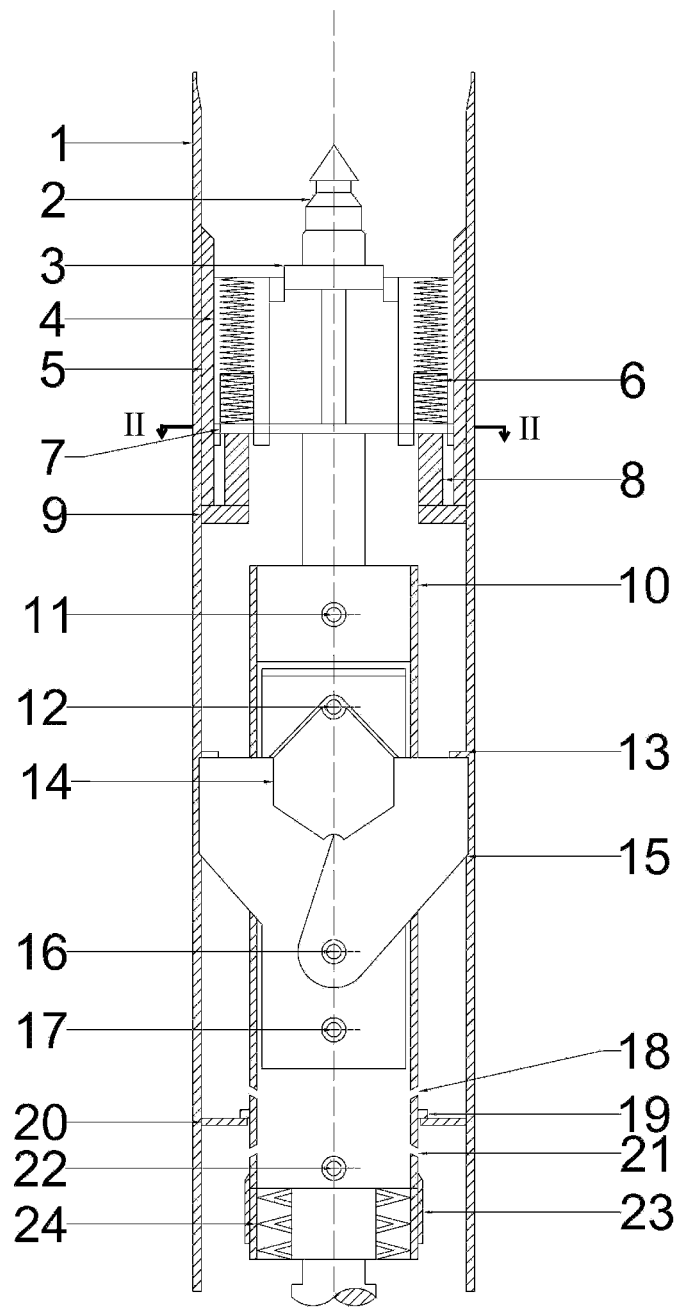
FIG. 1A is one partial view of FIG. 1.
Figure 1B:
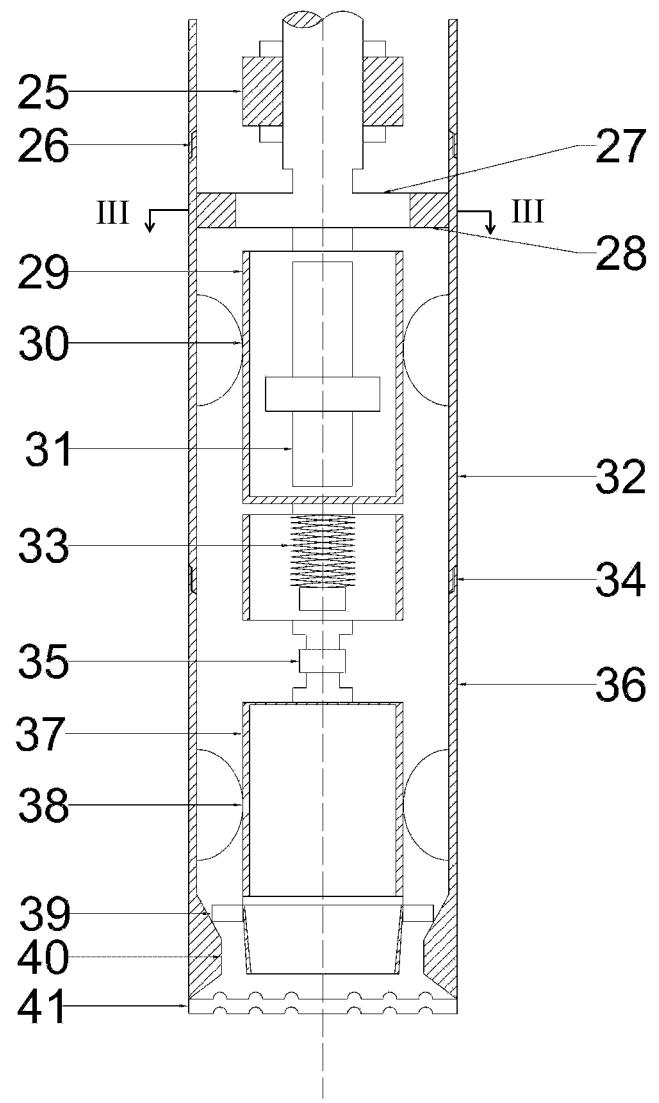
FIG. 1B is another partial view of FIG. 1.

In the drawing, 1: first single-wall drill pipe; 2: spear head; 3: top cap; 4: spring room; 5: sealing ring sleeve; 6: first spring; 7: spring bottom plate; 8: top blade; 9: first suspended seat ring; 10: recovery pipe; 11: first spring pin; 12: second spring; 13: bullet stop head; 14: bullet; 15: bullet room; 16: first bullet pin; 17: second bullet pin; 18: first recovery pipe nozzle; 19: suspension ring; 20: second suspended seat ring; 21: second recovery pipe nozzle; 22: second spring pin; 23: sliding sleeve; 24: disc spring; 25: single-action mechanism; 26: first joint; 27: probe room positioning inner lock; 28: probe room positioning outer lock; 29: probe room; 30: first centralizing ring; 31: probe rod; 32: second single-wall drill pipe; 33: buffer mechanism; 34: second joint; 35: adjustment mechanism; 36: third single-wall drill pipe; 37: core tube; 38: second centralizing ring; 39: lock ring; 40: lock ring seat; 41: drill.

DETAILED DESCRIPTION OF THE PREFERRED EMBODIMENT

In order to make the objectives, technical solutions and advantages of the present invention clearer, the present invention is further described in detail with accompanying drawings as follows.

Figure 2:
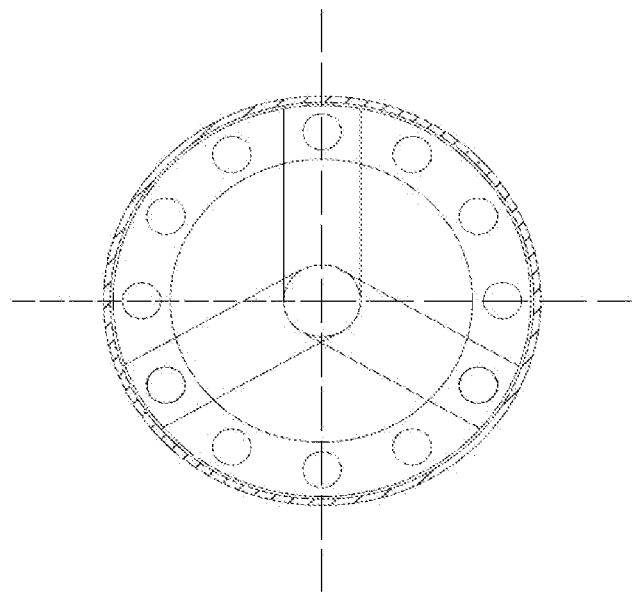
FIG. 2 is a sectional view of the pressured horizontal directional drilling continuous coring device for engineering geological investigation along II-II in FIG. 1.
Figure 3:
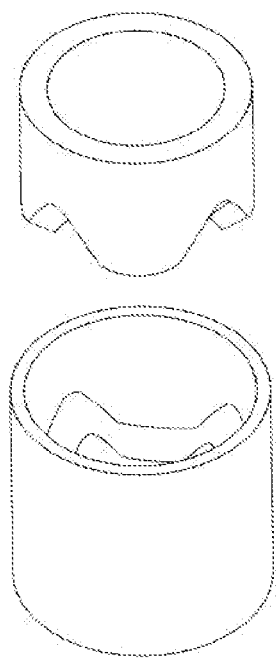
FIG. 3 is a sectional view of the pressured horizontal directional drilling continuous coring device for engineering geological investigation along in FIG. 1.
Figure 4:
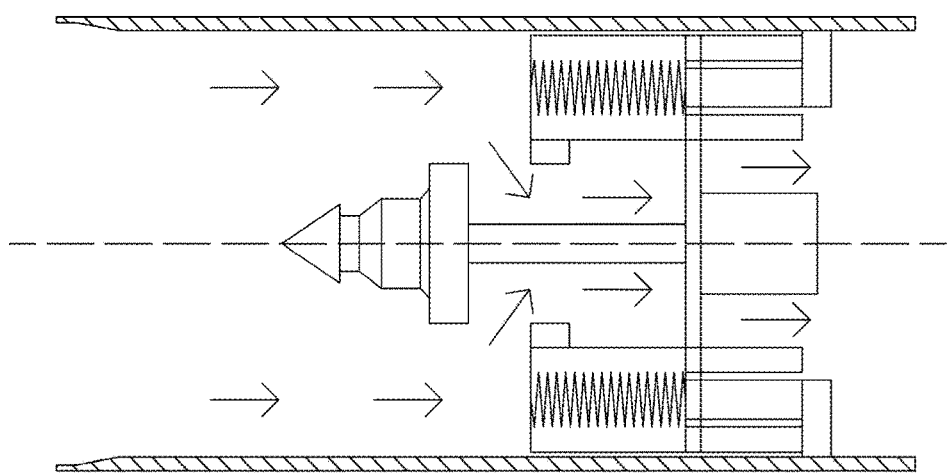
FIG. 4 is a schematic diagram of a drilling tool delivery and in-place reporting mechanism of the pressured horizontal directional drilling continuous coring device for engineering geological investigation provided by the present invention.
Figure 4:
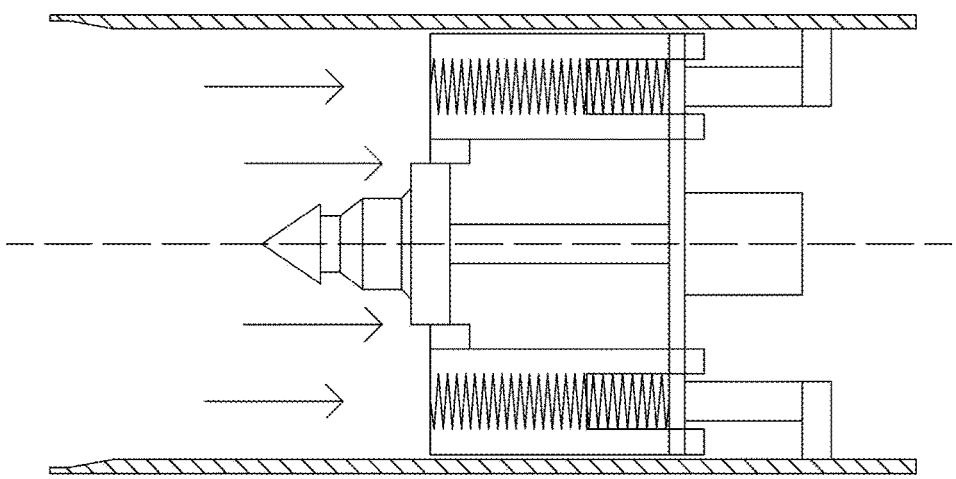
Figure 4:
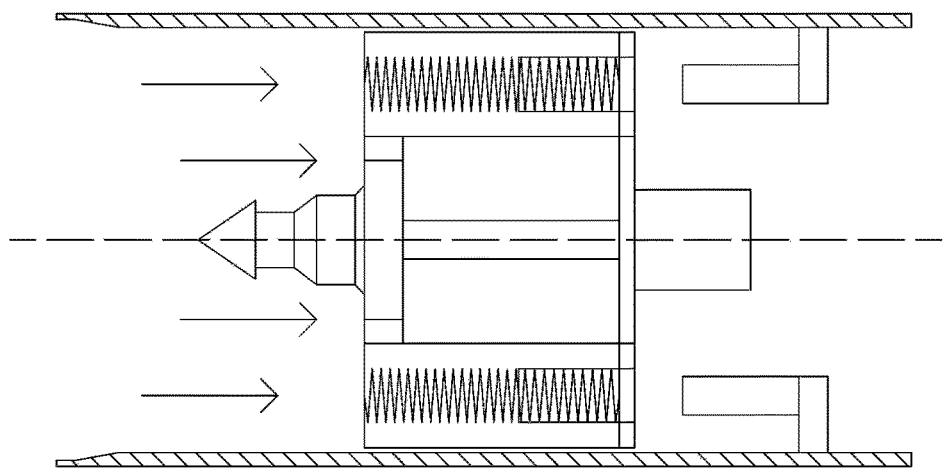

Referring to FIGS. 1, 2 and 3, a pressured horizontal directional drilling continuous coring device for engineering geological investigation according to a preferred embodiment of the present invention is illustrated, wherein the continuous coring device comprises a drilling tool assembly, a spear head 2 installed in the drilling tool assembly, a recovery pipe 10 and a core clamping mechanism, an interior of the drilling tool assembly is provided with a drilling tool delivery and in-place reporting mechanism, a bullet positioning mechanism, a core blockage alarm mechanism, a guiding mechanism, a buffer mechanism 33, an adjusting mechanism 35 from top to bottom. The recovery pipe 10 is provided with two recovery pipe nozzles, namely a first recovery pipe nozzle 18 and a second recovery pipe nozzle 21, a second suspended seat ring 20 is installed on an inner wall of a single-walled drill pipe assembly, and a suspension ring 19 is installed on an outer wall of the recovery pipe 10, and the second suspended seat ring 20 and the suspension ring 19 cooperate with each other so that the recovery pipe 10 does not fall downward.

Referring to FIG. 1, the drilling tool delivery and in-place reporting mechanism comprises a top cap 3, a spring room 4, a sealing ring sleeve 5, a first spring 6, a spring bottom plate 7, a top blade 8 and a first suspended seat ring 9. The first spring 6 is mounted on one side of the spring bottom plate 7, and the top blade 8 does not contact with the spring bottom plate 7 when the first spring 6 is in normal state. The top blade 8 contacts with the spring bottom plate 7 when the first spring 6 is in compressed state, and the sealing ring sleeve 5 is fitted to the inner wall of the single-walled drilling pipe assembly to prevent mud from penetrating from the inner wall of the single-walled drilling pipe assembly, thus ensuring mud pumping principle to carry out the pressure work of the internal mechanisms of the drilling tool assembly, the first suspended seat ring 9 connects the sealing ring sleeve 5 and the top blade 8, and the first spring 6 is mounted in the spring room 4.

The core blockage alarm mechanism comprises a first recovery pipe nozzle 18, a second recovery pipe nozzle 21, a second spring pin 22, a sliding sleeve 23 and a disc spring 24, wherein the sliding sleeve 23 is mounted on a side of the disc spring 24, and the sliding sleeve 23 is able to move with the disc spring 24 to completely cover the second recovery pipe nozzle 21, the second spring pin 22 is a mating part. When the internal mechanisms of the drilling tool assembly, i.e., the spear head 2, the recovery pipe 10, the core clamping mechanism, the drilling tool delivery and in-place reporting mechanism, the bullet positioning mechanism, the core blockage alarm mechanism, the guiding mechanism, the buffer mechanism 33, and the adjusting mechanism 35, are in the corresponding positions, the second spring pin 22 contracts in the natural state, and when these internal mechanisms are pulled, the second spring pin 22 contracts to realize the pulling of the internal mechanisms.

The drilling tool assembly comprises a single-wall drill pipe assembly and a drill bit 41 mounted on a bottom end of the single-wall drill pipe assembly, wherein the single-wall drill pipe assembly comprises three parts from top to bottom, namely a first single-wall drill pipe 1, a second single-wall drill pipe 32 and a third single-wall drill pipe 36, wherein the second single-wall drill pipe 32 is made of non-magnetic materials. The first single-wall drill pipe 1, the second single-wall drill pipe 32 and the third single-wall drill pipe 36 are interconnected by a first joint 26 and a second joint 34. The bullet positioning mechanism comprises a first spring pin 11, a second spring 12, a bullet stop head 13, two bullets 14, a bullet room 15, a first bullet pin 16 and a second bullet pin 17. An outer wall of the bullet room 15 is fitted to the inner wall of the single-walled drill pipe assembly, the two bullets 14 are interconnected by the first bullet pin 16, and two ends of the second spring 12 are connected to the two bullets 14 respectively.

The working principle of the bullet positioning mechanism is: the coring device moves forward in the drill pipe under the mud pressure, and when it is about to be in place, the bullets 14 contract and cross the bullet stop head 13, and finally the whole device is suspended by the lower limit position of the second suspended seat ring 20 and the suspension ring 19, while the bullets 14 are opened and suspended by the upper limit position of the bullet stop head 13, to realize the positioning of the device in place.

The guiding mechanism comprises a probe room positioning inner lock 27 connected with the single-action mechanism 25 and a probe room 29, wherein the probe room positioning outer lock 28 is cooperated with the probe room positioning inner lock 27 for ensuring that positions of the probe room 29 and the second single-wall drill pipe 32 are relatively fixed.

The probe room positioning inner lock 27 is connected with the single-action mechanism 25 through bearings to ensure that the probe room 29 does not rotate with the second single-wall drill pipe 32.

A probe rod 31 with a relatively fixed position is provided in the probe room 29. The probe room positioning inner lock 27, the probe room positioning outer lock 28, the probe room 29 and the first centralizing ring 30 are all made of non-magnetic materials.

The first centralizing ring 30 is provided between the probe room 29 and the second single-wall drill pipe 32 to keep the probe room 29 in place, a second centralizing ring 38 is provided between the core tube 37 and the third single-wall drill pipe 36 to keep the core clamping mechanism in place.

The buffer mechanism 33 has the function of shock absorption, so that the impact force on the core clamping mechanism during lifting or pressing is reduced, and the adjusting mechanism 35 is able to adjust the length between the core clamping mechanism and the guiding mechanism to facilitate the adjustment of the position of the core clamping mechanism.

The core clamping mechanism comprises a lock ring 39, a lock ring seat 40 and a core tube 37, wherein the lock ring 39 and the lock ring seat 40 cooperate with each other to prevent the core clamping mechanism from falling off.

The working principle of this pressured horizontal directional drilling continuous coring device is as follows: when the drilling tool delivery and in-place reporting mechanism is in place, the mud impacts the spring cap, the internal mechanisms of the drilling tool assembly, i.e., the spear head 2, the recovery pipe 10, the core clamping mechanism, the drilling tool delivery and in-place reporting mechanism, the bullet positioning mechanism, the core blockage alarm mechanism, the guiding mechanism, the buffer mechanism 33, and the adjusting mechanism 35, move downward. If the pressure on the spring cap is small, the first spring 6 is in the normal state. If the pressure on the spring cap is large, the top blade 8 presses against the spring bottom plate 7 to compress the first spring 6 inside the spring room 4, and at the same time, the top cap 3 rises relatively to form a mud path, and the mud pressure decreases instantly to realize the in-place reporting function, and the internal mechanism is in the corresponding position at this time.

Using the probe rod 31 to monitor and adjust the direction of the drill 41 in real time to achieve precise guidance and control direction of horizontal directional drilling, and start the horizontal directional drilling engineering geological survey.

When the core is filled with core tube, the core tube moves up to compress the disc spring 24, so that the spring drives the sliding sleeve 23 to move upward, thus completely covering the second recovery pipe nozzle 21, causing the pressure of the closed cavity where the sliding sleeve 23 is located to rise, playing the role of blockage alarm, and the core blockage alarm mechanism works to indicate that the core tube 37 has been filled with core.

The control rig winch traction wire rope pulls the rope to drive the spear head 2, so that the internal mechanism moves upward until it pulls out of the hole and takes out the core.

A working process of the pressured horizontal directional drilling continuous coring device for engineering geological investigation comprises the steps of:

(1) connecting the coring device with a front end of a drilling rod of a drilling rig through the single-wall drill pipe of the outer tube assembly, and then sending the drilling rod and the coring device as a whole into a horizontal drill hole to be continuously cored;

(2) starting the drilling rig, performing drilling coring till the core tube is full, lifting the inner tube assembly through the spearhead with a rope core fishing device out of the drill hole, and taking out a core, wherein a sudden increase of mud pressure indicates that the core tube is full;

(3) putting the inner tube assembly into the drilling rod, and connecting the drilling rod.

(4) starting a mud pump, the inner tube assembly moving towards a bottom of the drill hole along the drilling rod under the mud pressure, and fitting the inner tube assembly with the outer tube assembly when the inner tube assembly reaches a bottom of the drilling rod, wherein a sudden decrease of the mud pressure indicates that the inner tube assembly reaches the bottom of the drilling rod and is in accordance with the outer tube assembly;

(5) repeating the steps (2) to (4) till completing drilling coring, and removing the coring device.

In the above description, the directional terms such as "front", "back", "upper" and "lower" are defined in terms of the positions of the parts in the drawings and the positions between the parts in the drawings, which is just for the clarity and convenience of expressing technical solutions. It should be understood that the use of the directional terms should not limit the protection scope of the present invention.

In the case of no conflict, the above-mentioned embodiment and the features in the embodiment herein are able to be combined with each other.

The above is only the preferred embodiment of the present invention and is not intended to limit the present invention. Any modification, equivalent replacement and improvement made within the spirit and principle of the present invention shall be included in the protection scope of the present invention.

What is claimed is:

1. A pressured horizontal directional drilling continuous coring device for engineering geological investigation, the coring device comprising a drilling tool assembly, a spear head installed in the drilling tool assembly, a recovery pipe and a core clamping mechanism, wherein an interior of the drilling tool assembly is provided with a drilling tool delivery and in-place reporting mechanism, a bullet positioning mechanism, a core blockage alarm mechanism, a guiding mechanism, a buffer mechanism, and an adjusting mechanism from top to bottom; the recovery pipe is provided with a first recovery pipe nozzle and a second recovery pipe nozzle; the drilling tool delivery and in-place reporting mechanism comprises a top cap, a first spring and a spring cap mounted on one end of the first spring, so that when the first spring is in a normal state, the spring cap fits side by side with the top cap, and when the first spring is in a compressed state, the spring cap is located at a lower end of the top cap, and a mud path is formed between the spring cap and the top cap.

2. The coring device according to claim 1, wherein the core blockage alarm mechanism comprises a sliding sleeve and a disc spring, the sliding sleeve is mounted on a side of the disc spring, and the sliding sleeve is moved with the disc spring to completely cover the second recovery pipe nozzle.

3. The coring device according to claim 1, wherein the drilling tool assembly comprises a single-wall drill pipe assembly and a drill bit mounted on a bottom end of the single-wall drill pipe assembly, wherein the single-wall drill pipe assembly comprises a first single-wall drill pipe, a second single-wall drill pipe and a third single-wall drill pipe from top to bottom, wherein the second single-wall drill pipe is made of non-magnetic materials.

4. The coring device according to claim 1, wherein the first single-wall drill pipe, the second single-wall drill pipe and the third single-wall drill pipe are interconnected by a first joint and a second joint, respectively.

5. The coring device according to claim 1, wherein the drilling tool delivery and in-place reporting mechanism comprises a top blade, a spring room, a sealing ring sleeve, a first spring, a first suspended seat ring and a spring bottom plate, wherein the first spring is mounted on one side of the spring bottom plate, the top blade is mounted on the other side of the spring bottom plate, the sealing ring sleeve is fitted to the inner wall of the single-walled drill pipe assembly, and the first suspension seat ring is connected to the sealing ring sleeve and the top blade.

6. The coring device according to claim 5, wherein the core blockage alarm mechanism comprises a spring pin.

7. The coring device according to claim 5, wherein the guiding mechanism comprises a probe room positioning outer lock mounted on an inner wall of the second single-walled drill pipe, a probe room positioning inner lock connected to the probe room positioning outer lock, a single-action mechanism mounted on the probe room positioning inner lock and a probe room, and a probe rod mounted in the probe room.

8. The coring device according to claim 7, wherein the probe room positioning inner lock is connected with the single-action mechanism through bearings to ensure that the probe room does not rotate with the non-magnetic drill pipe.

9. The coring device according to claim 1, wherein a first centralizing ring is provided between the probe room and the second single-wall drill pipe, a second centralizing ring is provided between the core tube and the third single-wall drill pipe.

* * * * *